(12) United States Patent
Shibuya et al.

(10) Patent No.: US 6,231,220 B1
(45) Date of Patent: May 15, 2001

(54) VEHICLE LAMP

(75) Inventors: Yuuzi Shibuya; Hidetsugu Yamamoto, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/371,858

(22) Filed: Aug. 11, 1999

(30) Foreign Application Priority Data

Sep. 18, 1998 (JP) .................................................. 10-264374

(51) Int. Cl.$^7$ ....................................................... B60Q 1/00
(52) U.S. Cl. ........................ 362/507; 362/512; 362/514; 362/515; 362/528; 362/421
(58) Field of Search ..................... 362/512, 514, 362/515, 528, 421, 282, 507; 264/264, 27.1

(56) References Cited

U.S. PATENT DOCUMENTS

| | | | |
|---|---|---|---|
| 5,021,930 | * | 6/1991 | Yammada ............................. 362/507 |
| 5,615,939 | * | 4/1997 | Dobler et al. ......................... 363/514 |
| 5,765,935 | * | 6/1998 | Katsumata et al. ................... 362/268 |

\* cited by examiner

Primary Examiner—Sandra O'Shea
Assistant Examiner—Bertrand Zeade
(74) Attorney, Agent, or Firm—Sughrue, Mion, Zinn, Macpeak & Seas, PLLC

(57) ABSTRACT

A vehicle lamp having an aiming mechanism, in which a spherical pivot and a ball seat can readily be formed with great accuracy by reducing the number of parts and assembling steps. A fulcrum portion 7 of the aiming mechanism in a vehicle lamp includes a spherical pivot 10 formed integrally with a reflector 3, and a ball seat 20 formed integrally with a lamp body 1, which is used for receiving the spherical pivot 10. The spherical pivot 10 which has a spherical portion 12 and a strut portion 13 and is projected from the reflector 3 in a direction substantially perpendicular to the mold-parting direction when the reflector 3 is molded, does not require sliders for use in molding the spherical pivot. Moreover, the ball seat 20 includes a curved surface groove portion 21 and a pair of ball holding-down plates 22 with the spherical portion 12 of the spherical pivot 10 held therebetween. In accord with the above, it is unnecessary to prepare the spherical pivot 10 and the ball seat 20 separately from the reflector 3 and the lamp body 1, which therefore, reduces the number of parts as well as the assembling steps.

10 Claims, 8 Drawing Sheets

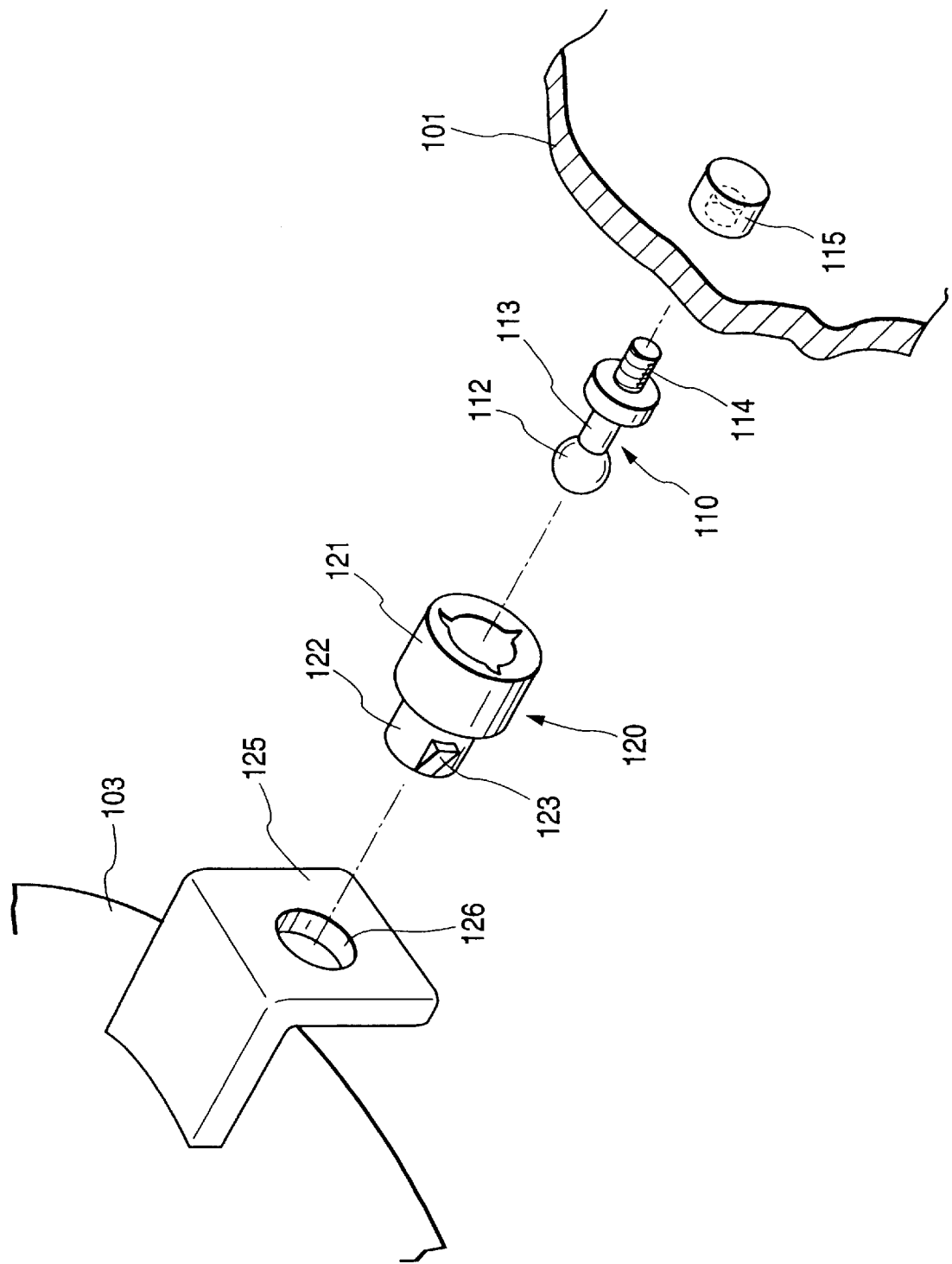

VEHICLE LAMP

BACKGROUND OF THE INVENTION

1. Field of the Invention

The present invention relates generally to vehicle lamps mounted in vehicles such as automobiles. More particularly, the invention relates to a vehicle lamp fitted with a reflector which is formed separately from a lamp body and tilted by an aiming mechanism.

2. Description of the Related Art

Vehicle lamps of the sort required to regulate light distribution characteristics of the light emitted from light sources as in the case of automobile headlamps are provided with an aiming mechanism for adjusting an optical axis of emission light. Conventionally, a reflector for supporting an electric bulb as a light source is installed in a lamp body separately from the lamp body and the aiming mechanism is employed for tilting the reflector horizontally and vertically with respect to the lamp body. Consequently, such an aiming mechanism is fitted with a fulcrum portion for tiltably supporting the reflector, a horizontal and a vertical aiming portion for respectively tilting the reflector horizontally and vertically. In particular, a pivot structure as a universal joint structure using a spherical pivot and a ball seat is employed in the fulcrum portion for making the reflector tiltable in the horizontal and vertical directions which are perpendicular to each other.

Heretofore, a pivot structure of the kind mentioned above, has been formed with a spherical pivot provided on the lamp body and reflector, and the ball seat provided on the other, so that the spherical pivot is received by the ball seat. In order to accomplish this construction, the spherical pivot and the ball seat have been formed separately from the lamp body and the reflector and then secured to the lamp body and the reflector, respectively. As shown in FIG. 8, for example, a spherical pivot 110 is secured to the inner surface of a lamp body 101, whereas a ball seat 120 is secured to a reflector 103. In this example, a strut portion 113 is formed integrally with a spherical portion 112, and a screw portion 114 coupled to the end portion of the strut portion 113 is screwed into a screw hole 115 bored in the inner surface of the lamp body 101 so as to secure the spherical pivot 110 to the lamp body 101. Further, a ball seat 120 is formed with a cylindrical portion 121 with one end portion formed like a circular mortar, and a fitting portion 122 with the other portion having a lance 123 smaller in diameter than the cylindrical portion, the other end portion being securely fitted into the hole 126 of a stem 125 projecting in the back of the reflector 103. When the spherical portion 112 of the spherical pivot 110 is forced into the cylindrical portion 121 of the ball seat 120 from the leading end portion of the cylindrical portion 121, the spherical pivot 110 is received by the ball seat 120, which causes the reflector 103 to be tiltably supported by the lamp body 110.

As the conventional fulcrum portion has been arranged so that the spherical pivot and the ball seat formed separately from the lamp body and the reflector are respectively secured to the lamp body and the reflector, not only the number of parts but also the number of assembling steps tends to increase, which results in the problem of increasing cost in the vehicle lamp. Therefore, it has been taken into consideration to form the spherical pivot and the ball seat integrally with the lamp body and the reflector, respectively. However, since the pivot is spherical or substantially spherical, undercutting easily develops in the mold when an attempt is made to resin-mold the spherical pivot integrally with the lamp body or the reflector, causing difficulties in the resin-molding process. In particular, when the spherical pivot 110 is formed so as to project in the direction of parting molds for resin-molding the lamp body 101 and the reflector 103, that is, when it is normally formed so as to project along the longitudinal direction of the lamp, the undercutting cannot be dealt with unless a slider is used for the mold. In other words, any attempt to force these resin-molding component parts to be drawn out without using any slider would result in difficulty in molding a spherical pivot having the required quality. For this reason, the mold structure has heretofore become complicated and failed to facilitate the molding operation. On the other hand, molding the ball seat 120 using the sliders still remains difficult because the cylindrical portion 121 is formed like a circular mortar, making it necessary to force the component parts to be drawn out. Moreover, errors develop in the shape and dimensions of the molded ball seat. Further, accurate aiming becomes hardly attainable because backlash and deviation are produced when the aiming mechanism is installed.

SUMMARY OF THE INVENTION

To solve the above problems, it is an object of the present invention to provide a vehicle lamp, in which a spherical pivot and a ball seat can readily be formed with great accuracy by reducing the number of parts and assembling steps.

Accordingly, to achieve the above objective, there is provided a vehicle lamp having an aiming mechanism, where the aiming mechanism is fitted with a pivot structure serving as a fulcrum operating to tilt a reflector. The pivot structure includes a spherical pivot formed integrally with the reflector and a ball seat formed integrally with the lamp body, which is used for receiving the spherical pivot. The spherical pivot is projected from the reflector in a direction substantially perpendicular to the mold-parting direction when the reflector is molded.

To further achieve the above objective, the ball seat includes a curved surface groove portion formed by concaving part of the inner surface of the lamp body and used for receiving part of the spherical surface of the spherical pivot, and a plurality of ball holding-down plates formed integrally with the lamp body in positions opposite to the curved surface groove portion and brought into contact with the spherical surface portion as part of the diametrically opposite spherical surface of the spherical pivot.

To further achieve the above objective, the ball holding-down plates include a pair of upright wall portions in both the respective opposed positions of the curved surface groove portion with a space greater than the diametric dimension of the spherical pivot held therebetween and a tilted wall portion projected in a tilted condition toward the curved surface groove portion, the tilted wall portion being provided in the leading end portion of each upright wall portion. The projected tip of each tilted wall portion is brought into contact with the opposed spherical portion of the spherical pivot, where the projected end of one tilted wall portion facing the projected end of the other tilted wall portion with a space smaller than the diametric dimension of the spherical pivot is held therebetween. One end portion of each tilted wall portion ends on the inner surface of the lamp body, whereas the other end portion thereof is opened thereon. Also, a stopper portion extended in the center direction of the spherical pivot is provided in the other end portion thus left open.

Preferably, the spherical pivot is resin-molded integrally with the reflector and has a hollow directed to the ball center in a area along the parting line formed when the reflector is molded.

According to the present invention, the spherical pivot formed integrally with the reflector and the ball seat formed integrally with the lamp body constitute the fulcrum portion of the aiming mechanism, and the spherical pivot is projected from the outer surface of the reflector in a direction substantially perpendicular to the direction of parting the molds when the reflector is molded according to the present invention, whereby sliders for use in molding the spherical pivot can be dispensed with. The mold structure can thus be simplified and the spherical pivot and the ball seat are unnecessary for being prepared separately from the reflector and the lamp body, which results in making it possible to reduce the number of parts as well as that of assembling steps. Moreover, forcing the spherical pivot and the ball seat to be drawn out is unnecessary, which results in the spherical pivot and the ball seat being molded with great accuracy. The fact that the fulcrum portion capable of smooth spherical surface operation is formable makes possible an accurate aiming adjustment in the aiming mechanism. Further, the formation of the hollow in the spherical portion of the spherical pivot prevents flashes from being projected from the spherical surface of the spherical portion, which makes possible the smooth spherical surface movement of the spherical pivot to ensure the smooth operation and improved durability of the fulcrum portion of the aiming mechanism.

BRIEF DESCRIPTION OF THE DRAWINGS

The above objectives and advantages of the present invention will become more apparent by describing in detail a preferred embodiment thereof with reference to the attached drawings in which:

FIGS. 5(a), 5(b) and 5(c) illustrate an embodiment of the present invention.

FIGS. 7(a), 7(b) and 7(c) illustrate an embodiment of the present invention.

FIG. 8 is a partial exploded perspective view of an example of a conventional fulcrum portion.

DESCRIPTION OF THE PREFERRED EMBODIMENTS

Hereinafter, a preferred embodiment of a vehicle lamp will be described in detail with reference to the attached drawings. However, the preferred embodiment is merely an example of the present invention, and thus, the specific features described below are merely used to more easily describe such embodiments and to provide an overall understanding of the present invention. Accordingly, one skilled in the art will readily recognize that the present invention is not limited to the specific embodiment described below. Furthermore, the description of various configurations of the present invention which would have been known to one skilled in the art are omitted for the sake of clarity and brevity.

Figure 1:
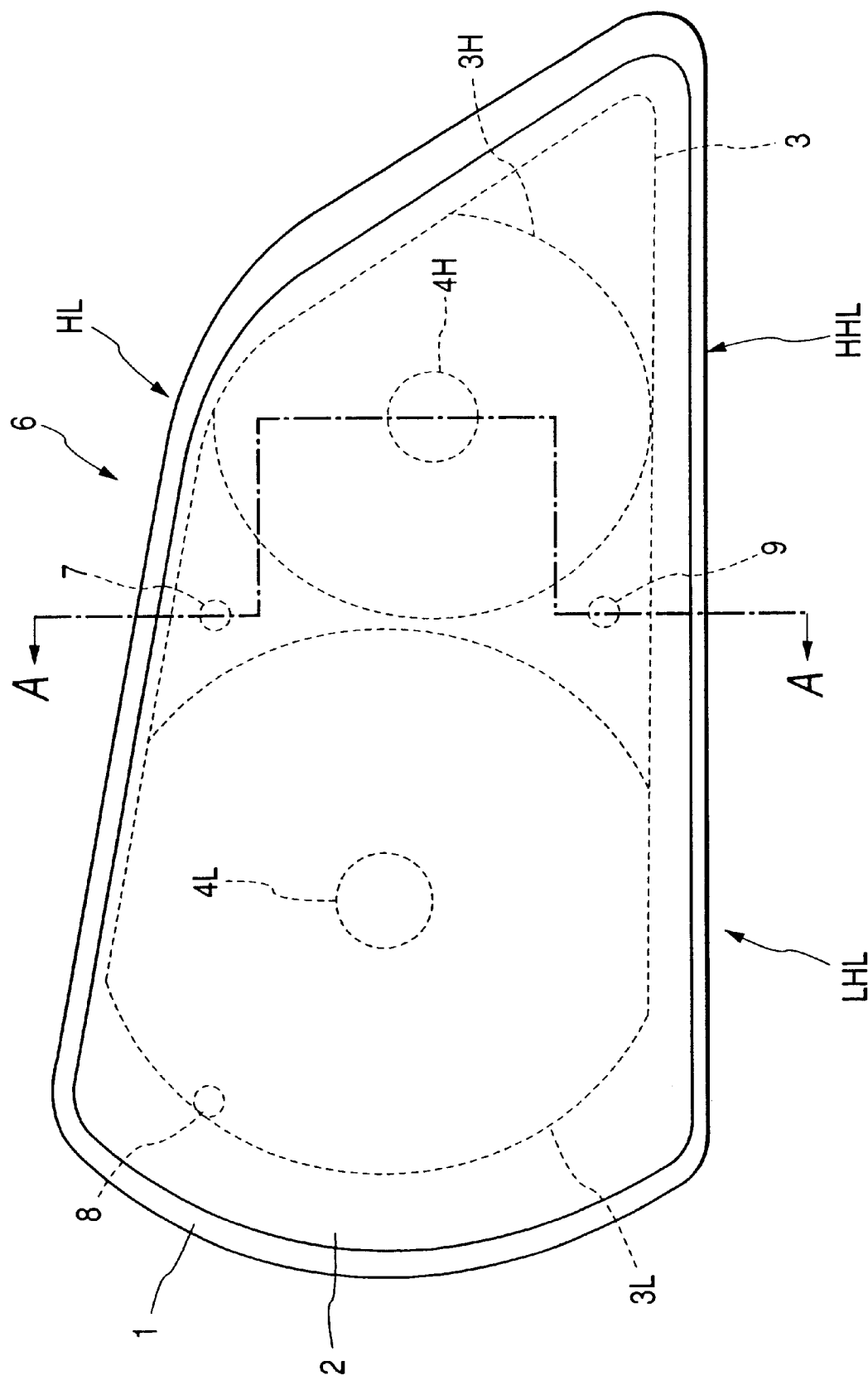
FIG. 1 is an elevational view of a vehicle lamp according to an embodiment of the present invention.
Figure 2:
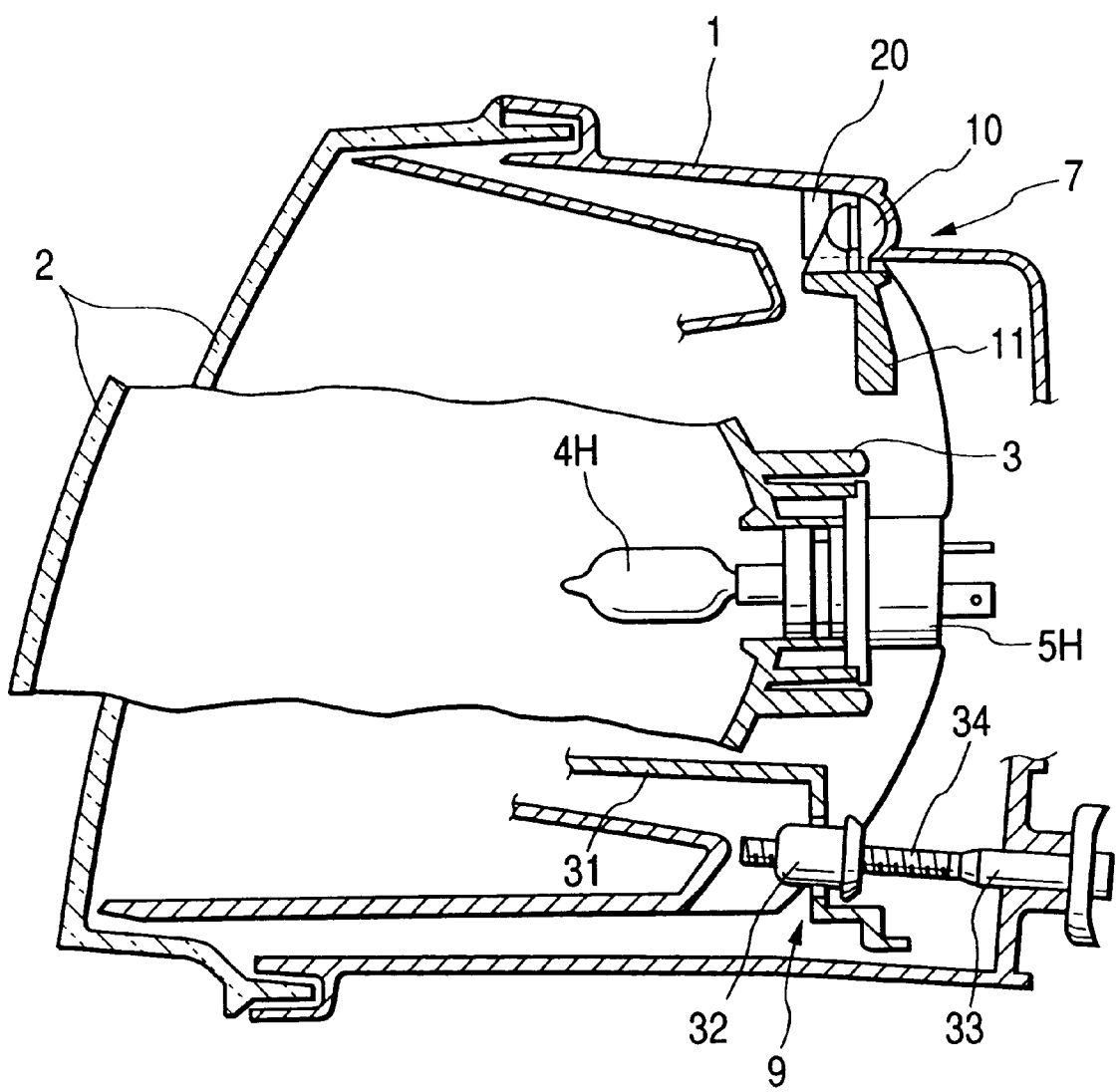
FIG. 2 is a sectional view taken on line A—A of FIG. 1 according to an embodiment of the present invention.
Figure 3:
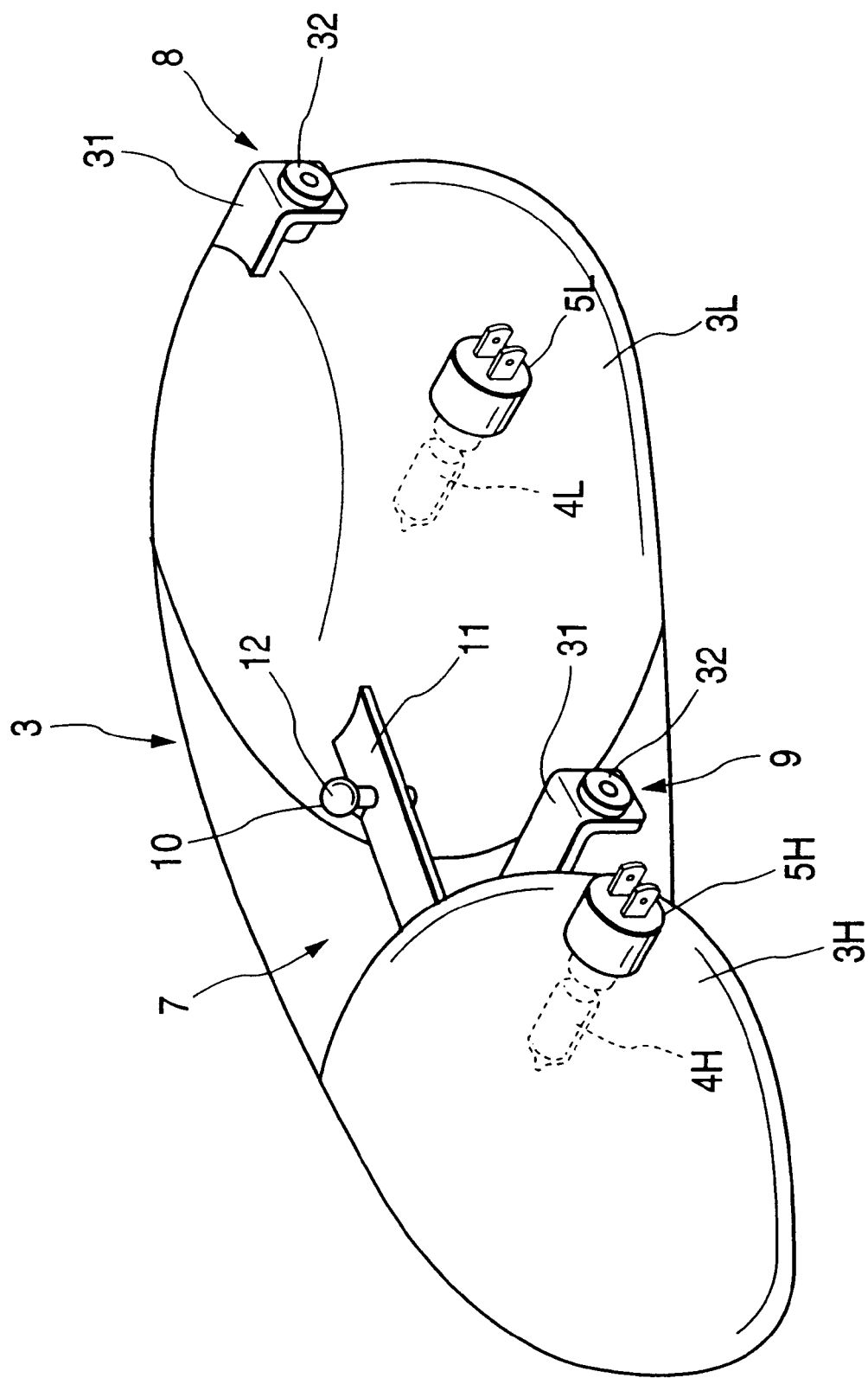
FIG. 3 is a rear elevational view of a reflector according to an embodiment of the present invention.

An embodiment of the invention will now be described with reference to the drawings. FIG. 1 is an elevational view of a headlamp on one side of a four-lamp type automobile headlamp according to the present invention. More specifically, FIG. 1 shows a right-hand-side automobile headlamp HL comprising a right-hand-side high beam lamp HHL and a left-hand-side low beam lamp LHL which are integrally disposed in a lamp body. FIG. 2 is a sectional view taken on line A—A of FIG. 1, wherein a resin-molded lamp body 1 and a lens 2 fitted in the front opening of the lamp body 1 constitute a lamp chamber in which a reflector 3 is installed. As shown in a rear elevation of FIG. 3, the reflector 3 includes integral resin-molded reflector portions 3H and 3L for the respective lamps HHL and LHL, the inner surfaces of the reflector portions 3H and 3L being coated with an aluminum film so as to form reflective surfaces. Further, bulb sockets 5H and 5L for supporting electric bulbs 4H and 4L are detachably fitted in bulb-socket fitting holes bored in the backs of the reflector portions 3H and 3L through bulb-socket inserting holes (not shown) bored in the back of the lamp body, respectively. The bulb sockets 5H and 5L are each fitted with rubber covers capable of elastic deformation between the bulb-socket inserting holes of the lamp body 1 so as to not only waterproof the bulb-socket inserting holes but make the reflector 3 tiltable by means of an aiming mechanism as will be explained below.

The reflector 3 is supported by the aiming mechanism 6 with respect to the lamp body 1 so that the vertical and horizontal tiltings of the reflector 3 may be adjustable. The aiming mechanism 6 is basically similar in construction to any aiming mechanism that has been proposed so far and as shown in FIG. 1 includes a fulcrum portion 7 for supporting the reflector 3 tiltably in the horizontal and vertical directions, a horizontal aiming portion 8 for tilting the reflector 3 horizontally with the fulcrum portion 7 as a fulcrum, and a vertical aiming portion 9 for tilting the reflector 3 in a direction perpendicular to the horizontal direction above. The fulcrum portion 7, which will be described in detail later, includes a spherical pivot 10 formed integrally with the reflector 3, and a ball seat 20 formed integrally with the lamp body 1. In this case, the horizontal and vertical aiming portions 8 and 9 are similar in construction. The vertical aiming portion 9 as shown in FIG. 2 by way of example includes an aiming nut 32 fitted to a stem 31 projecting from the back of the reflector 3, and an aiming screw 33 extended in the longitudinal direction of the lamp in such a way as to pass through the back of the lamp body 1, a screwed portion 34 provided on the inner end portion of the aiming screw 33 being screwed into the aiming nut 32. When the aiming screw 33 is turned from the outside of the lamp body 1, the aiming nut 32, that is, the stem 31 and the reflector 3 are axially moved toward the aiming screw 33 so as to tilt the reflector 3 vertically with the fulcrum portion 7 as a fulcrum. This is also the case with the horizontal aiming portion 8, wherein like reference characters designate corresponding parts of FIG. 3.

Figure 4:
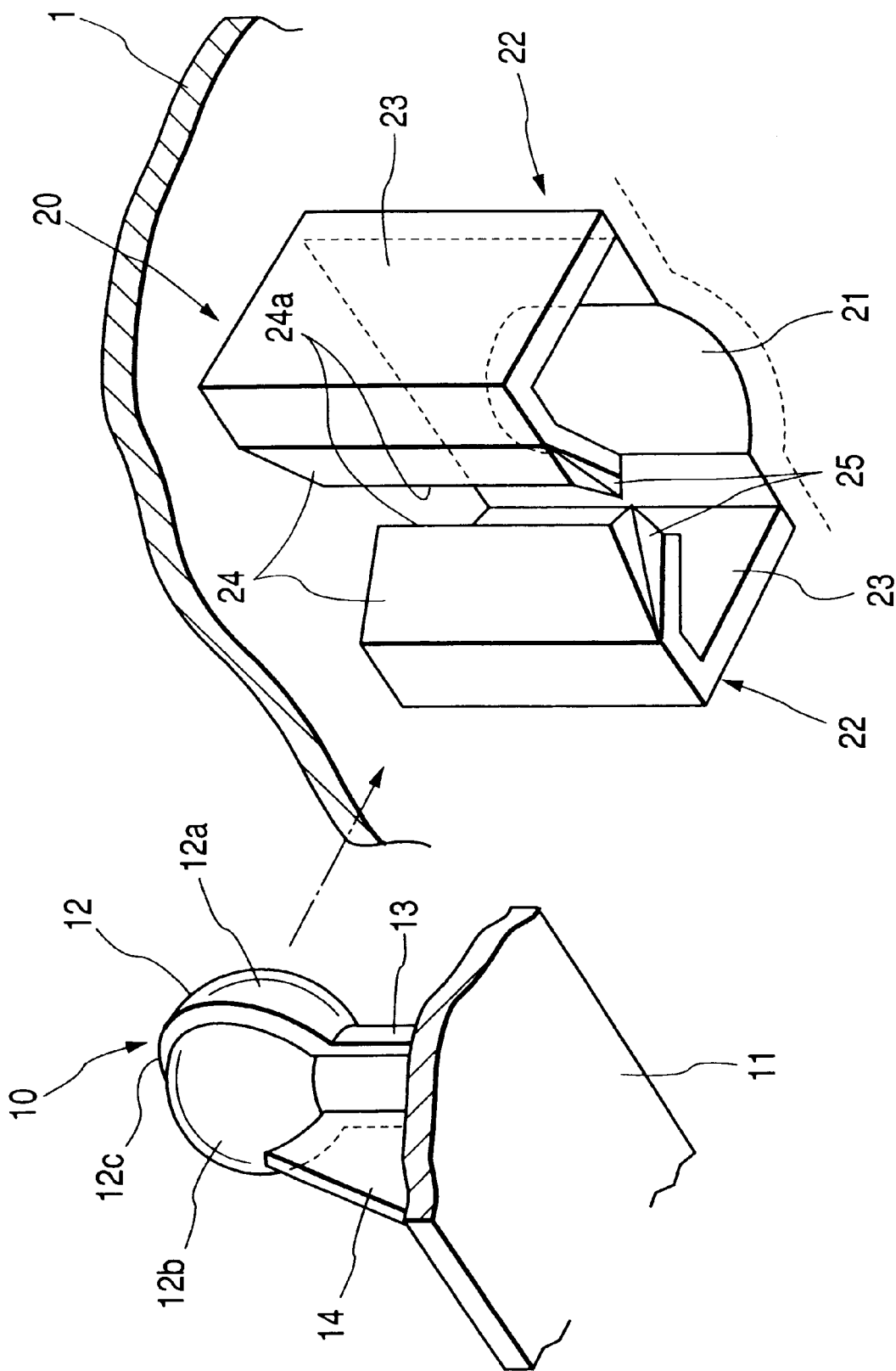
FIG. 4 is an exploded perspective view of a fulcrum portion according to an embodiment of the present invention.
Figure 5A:
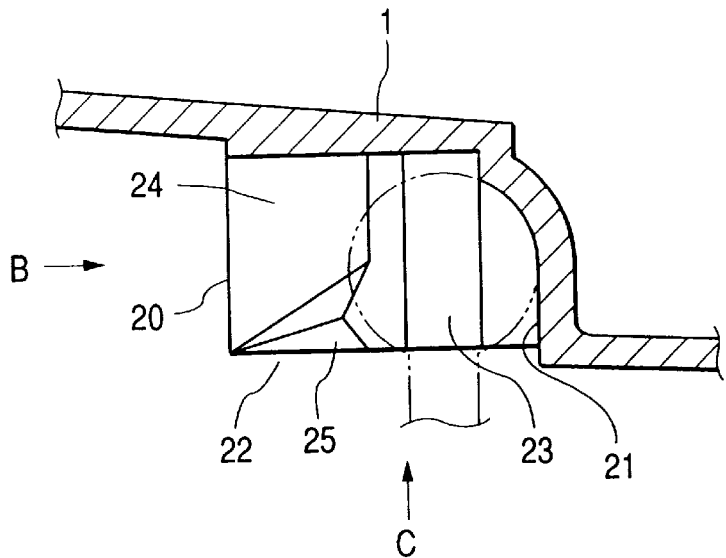
FIG. 5(a) is a side sectional view of a ball seat with arrow diagrams B and C.
Figure 5B:
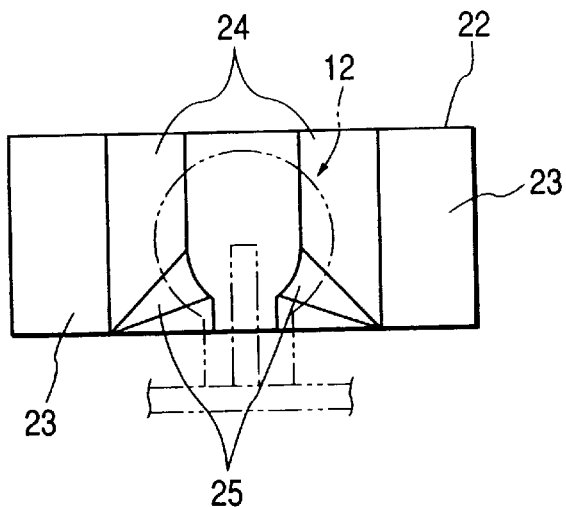
FIG. 5(b) is a front view of a ball seat.
Figure 5C:
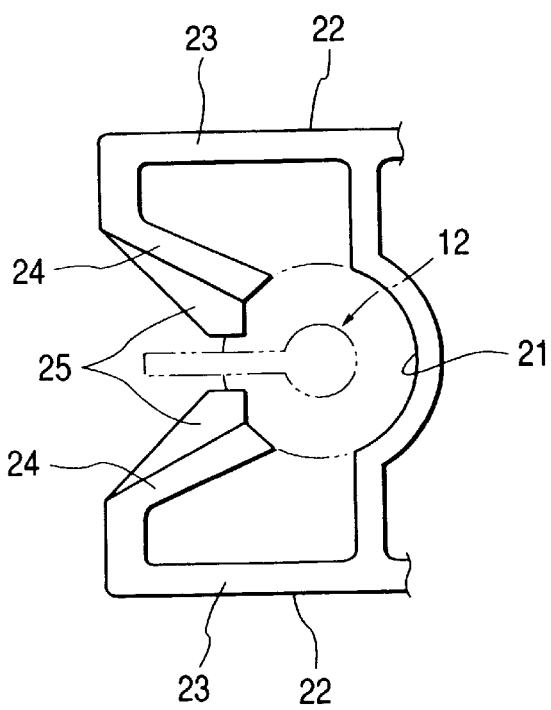
FIG. 5(c) is a top view of the ball seat.
Figure 6:
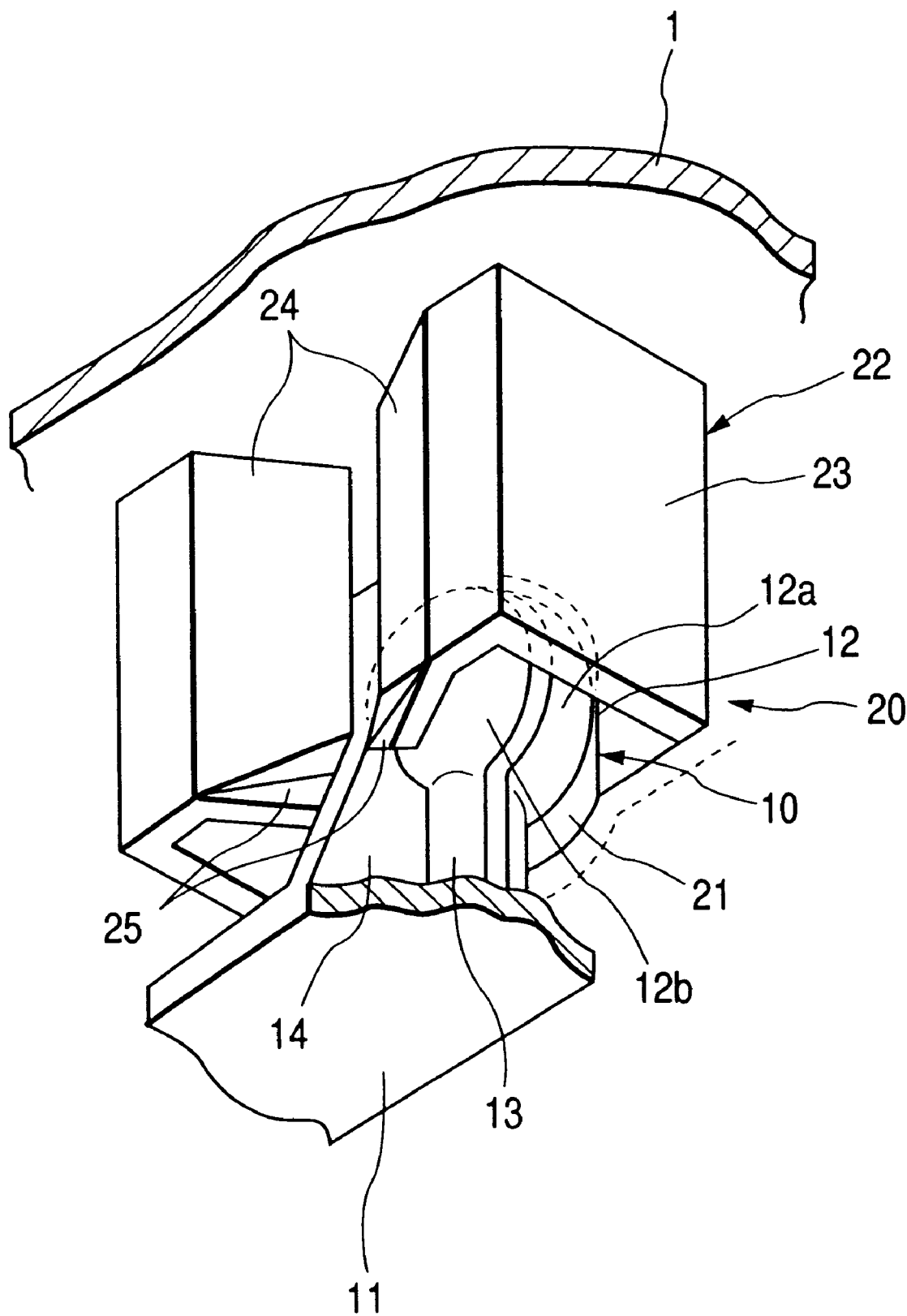
FIG. 6 is a perspective view of the fulcrum portion in an assembled state according to an embodiment of the present invention.

FIGS. 4–6 show the construction of the fulcrum portion 7, wherein FIG. 4 is an exploded perspective view of the fulcrum portion 7; FIG. 5(a), a side sectional view of the ball seat 20 with arrow diagrams B and C; FIG. 5(b), a front view of the ball seat 20; FIG. 5(c), a top view of the ball seat 20; and FIG. 6, a perspective view of an assembly of the fulcrum portion 7. The ball seat 20 is formed integrally with the lamp body 1 in a position close to the upper base of the inner surface of the back side of the lamp body 1. In other words, the ball seat 20 comprises a curved surface groove portion 21 close to a spherical or cylindrical surface which is formed by concaving part of the rear-side inner surface of the lamp body 1 along the vertical direction of the lamp, and a pair of ball holding-down plates 22 facing the curved surface groove portion 21. More specifically, the ball holding-down plate 22 is formed with upright wall portions 23 directed toward the front of the lamp in such a position as to hold the curved surface groove portion 21 between the lateral directions of the lamp with a space greater than the diametric dimension of the spherical portion of the spherical pivot 10 which will be explained shortly, and tilted wall portions 24 whose leading ends are projected in a tilted condition from the front edge portions of the upright wall portions 23 toward the curved surface groove portion 21, that is, in the condition tilted inward between the upright wall portions 23 in the rear of the lamp. The projected leading end edges 24a of the tilted wall portions 24 are set opposite to the curved surface groove portion 21 with a space substantially close to the diametric dimension of the spherical portion 12, and the projected leading end edges 24a face each other in parallel along the vertical direction of the lamp with a space smaller than the diametric dimension of the spherical portion 12. Further, the upper-side ends of the upright wall portions 23 and the tilted wall portions 24 end in such a state that the upper-side ends thereof are kept in contact with the inner surface of the upper base of the lamp body 1 but the opposite lower side ends of them are left open and the tilted wall portions 24 at the open ends are each formed with integral wedge-like stopper portions 25 projecting inward. The ball seat 20 is formed by a resin molding tool using sliders, though the detailed description thereof will be omitted.

On the other hand, the spherical pivot 10 is formed integrally with the reflector 3 and according to this embodiment of the invention the spherical pivot 10 is formed uprightly in the mid position of a horizontal stem 11 stretched in the back of reflector portions 3H and 3L. The spherical pivot 10 includes the substantially spherical portion 12 and a strut portion 13 which is extended from part of the spherical portion 12 and used to support the spherical portion 12 at a predetermined height. Moreover, a positioning wall 14 in the form of a triangular wing projected toward the front of the lamp from one side portion of the strut portion 13 is provided on one side of the strut portion 13. In this case, the reflector 3 is resin-molded by a pair of molds parted in the longitudinal direction, that is, in the lateral direction of FIG. 2. Correspondingly, the spherical pivot 10 is placed on the parting faces of both the molds and directed by the strut portion 13 along the parting faces, that is, perpendicular to the direction of parting the molds.

Figure 7A:
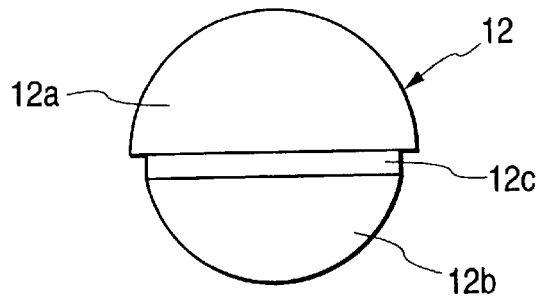
FIG. 7(a) is a plan view of a spherical portion.
Figure 7B:
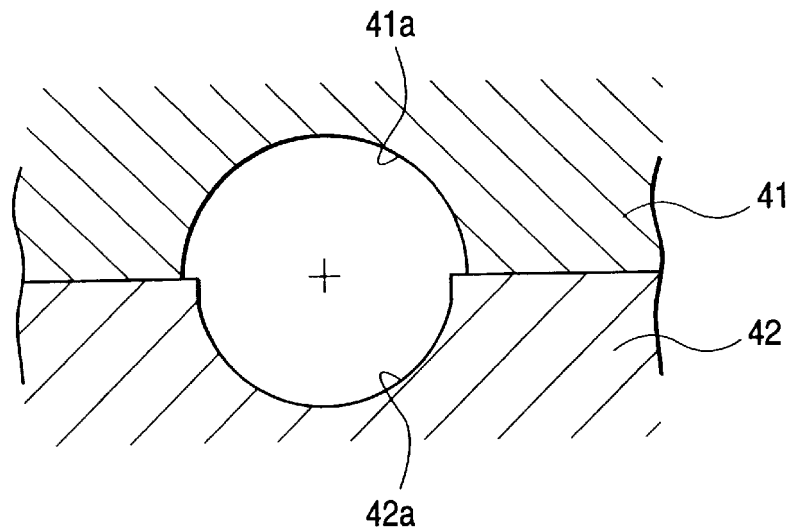
FIG. 7(b) is a sectional view of the molds and the spherical portion.

As shown in FIG. 7(a) as a plan view of the spherical portion 12 and FIG. 7(b), a partial enlarged view of molds 41 and 42 for use in resin-molding the spherical portion 12, a hemispherical concave portion 41a whose diameter is equal to the diameter of the spherical portion 12 of the spherical pivot 10 is formed in one of the molds, that is, in the mold 41 on the rear side of the lamp in this case, whereas a hemispherical concave portion 42a whose diameter is slightly smaller than the diameter of the spherical portion 12 is formed in the mold 42 on the front side of the lamp.

Figure 7C:
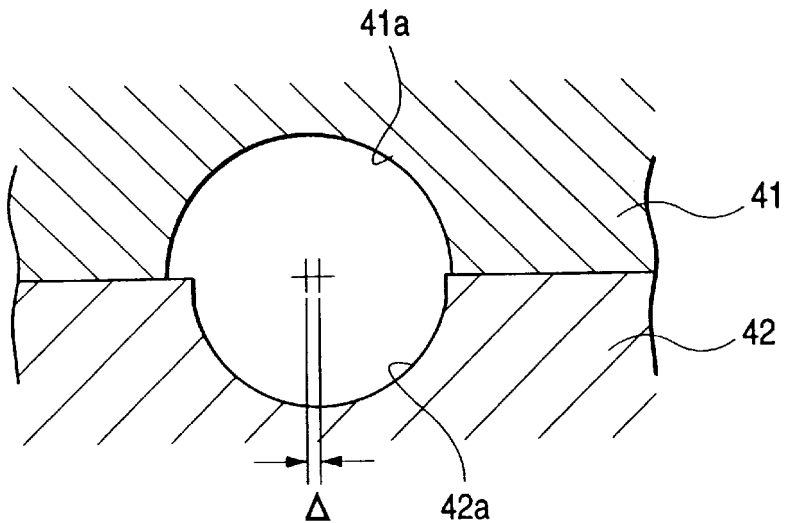
FIG. 7(c) is a sectional view of the molds and the spherical portion illustrating an error Δ.

Consequently, the spherical portion 12 molded by these molds 41 and 42 is formed by combining a large-diameter hemispherical portion 12a and a small-diameter hemispherical portion 12b each corresponding to the concave portions 41a and 42a of the respective molds. On the boundary between these large- and small-diameter hemispherical portions lies a hollow 12c directed to the ball center is formed along the parting faces of the molds 41 and 42 to cope with the dimensional difference between both the hemispherical portions. The provision of the hollow 12c prevents flashes from being produced on the faces of the molds 41 and 42 even though the dimensional difference between the molds 41 and 42 or an error Δ in aligning the molds at the molding time occurs (see FIG. 7(c)), thus preventing flashes from being produced on the spherical surface of the spherical portion 12. Incidentally, flashes tend to become produced if the dimensions of concave portions of the molds are equal because of dimensional or alignment errors. The flashes impede the smooth spherical surface operation of the spherical pivot 10 and the smooth tilting operation of the reflector when the ball is received by the ball seat 20.

With the fulcrum portion 7 thus formed with the spherical pivot 10 and the ball seat 20, the spherical portion 12 of the spherical pivot 10 is inserted in between the ball holding-down plates 22 of the ball seat 20 in the direction of an arrow of FIG. 4 when the reflector 3 is forced into the lamp body 1 from the front of the lamp body 1 as shown in FIG. 6 (see also arrow B in FIG. 5(a)). At this time, the spherical portion 12 is guided along the tilted surfaces of the tilted wall portions 24 of the respective ball holding-down plates 22 and climbs over the projected leading end edges 24a while subjecting the projected leading end edges 24a of both the respective tilted wall portions 24 to elastic deformation so as to be forced in until reaching the curved surface groove portion 21. In the aforementioned forced-in condition, part of the spherical surface of the spherical portion 12 is brought into contact with the curved surface groove portion 21, and part of the opposite-side spherical surface is brought into contact with the projected leading end edges 24a of the respective tilted wall portions 24, whereby the spherical portion 12 is held and supported by the curved surface groove portion 21 and the projected leading end edges 24a in three places opposite to the diametric direction of the spherical surface. Therefore, the spherical portion 12 is capable of spherical surface movement in such a state that the spherical portion 12 is kept in contact with the curved surface groove portion 21 and the projected leading end edges 24a, and the reflector 3 becomes able to function as a fulcrum when the reflector 3 is tilted horizontally and vertically. Moreover, the strut portion 13 of the spherical pivot 10 never impairs the spherical surface movement of the spherical pivot 10 because the strut portion 13 thereof is insert-positioned on the open-end sides of both the ball holding-down plates 22.

In this assembled state, further, the spherical portion 12 of the spherical pivot 10 may slip off from the lower open end side of each ball holding-down plate 22. However, since the stopper portion 25 provided at the lower open end side of each tilted wall portion 24 of the ball holding-down plate 22 is projected from the tilted wall portion 24 toward the inner surface of the lamp body 1, the spherical portion 12 is kept in contact with the stopper portion 25 and prevented from slipping off and never caused to slip off. However, the stopper portions 25 in the wedge form allow the spherical portion 12 to be pulled out from between the ball holding-down plates 22 by drawing the spherical pivot 10 toward the open end sides of the respective ball holding-down plates 22 with a strong force, in which the stopper portions 25 are forcibly deformed so as to expand both the tilted wall portions 24. Consequently, the reflector 3 can be drawn out of the lamp body 1 in a direction C as shown in FIG. 5(a).

According to this embodiment of the present invention, the spherical pivot 10 and the reflector 3 of the vehicle lamp are integrally resin-molded while the ball seat 20 and the lamp body 1 are integrally resin-molded so that the individual parts constituting the fulcrum portion 7 of the aiming mechanism 6 are entirely unnecessary to prepare. Therefore, the number of parts constituting the vehicle lamp is made reducible, which is effective in reducing not only the number of assembling steps but also the production cost. Since the strut portion 13 and spherical portion 12 of the spherical pivot 10 are extended along the direction of the parting line formed when the reflector 3 is molded even at the time the spherical pivot 10 is resin-molded integrally with the reflector 3, moreover, the spherical pivot 10 can be formed integrally with the reflector 3 without providing any slider for the mold, and the mold structure is prevented from becoming complicated. However, it has been so arranged that the pair of ball holding-down plates 22 in the ball seat 20 are extended in a direction substantially perpendicular to the longitudinal direction as the direction of parting the molds when the lamp body 1 is molded, whereby the mold needs sliders to form the ball holding-down plates integrally with the lamp body. Nevertheless, as each ball holding-down plate 22 is formed so that its lower end side directed to the inside of the lamp body 1 is formed as an open end, the slider can be drawn toward the open end side. Consequently, the slider structure may be simplified, which is effective in preventing the mold structure from becoming complicated. As the spherical pivot 10 and the ball seat 20 need not be drawn out forcibly when the molds are parted, the spherical pivot and the ball seat can both be molded with great accuracy.

As set forth above, the pivot structure constituting the fulcrum portion of the aiming mechanism according to the present invention includes the spherical pivot formed integrally with the reflector and the ball seat formed integrally with the lamp body and used for receiving the spherical pivot, which is projected from the reflector in a direction substantially perpendicular to the mold-parting direction when the reflector is molded, whereby sliders for use in molding the spherical pivot can be dispensed with. The mold structure can thus be simplified and the spherical pivot and the ball seat are unnecessary for being prepared separately from the reflector and the lamp body, which results in making it possible to reduce the number of parts as well as that of assembling steps. Moreover, forcing the spherical pivot and the ball seat to be drawn out is unnecessary, resulting in the spherical pivot and the ball seat being molded with great accuracy. The fact that the fulcrum portion capable of smooth spherical surface operation is formable makes possible the provision of a precision aiming mechanism. Further, the formation of the hollow in the spherical portion of the spherical pivot prevents flashes from being projected from the spherical surface of the spherical portion, which makes possible the smooth spherical surface movement of the spherical pivot to ensure the smooth operation and improved durability of the fulcrum portion of the aiming mechanism.

The previous description of an embodiment is provided to enable a person skilled in the art to make or use the present invention. Moreover, various modifications to the above embodiment will be readily apparent to those skilled in the art, and the generic principles defined herein may be applied to other embodiments without the use of inventive faculty. For example, although the present invention has been applied to the two-lamp type headlamp according to the aforementioned embodiment of the present invention, the present invention is applicable to any one of the vehicle lamps such as single-lamp type headlamps or fog lamps so arranged so as to tilt the reflector installed inside a lamp body by means of an aiming mechanism. Therefore, the present invention is not intended to be limited to the embodiment described herein but is to be accorded the widest scope as defined by the claims.

What is claimed is:

1. A vehicle lamp comprising:
   a lamp body;
   a reflector; and
   an aiming mechanism for tiltably supporting said reflector with respect to said lamp body, wherein
   said aiming mechanism includes a pivot structure serving as a fulcrum operating to tilt said reflector, said pivot structure including a spherical pivot formed integrally with said reflector and a ball seat formed integrally with said lamp body for receiving said spherical pivot, and
   said spherical pivot being projected from said reflector in a direction substantially perpendicular to a mold-parting direction when said reflector is molded.

2. A vehicle lamp as claimed in claim 1, wherein the ball seat comprises:
   a groove in an inner surface of said lamp body for receiving part of a spherical surface of said spherical pivot; and
   a plurality of plates formed integrally with said lamp body in positions opposite to said groove and contacting said spherical surface at diametrically opposite portions of said spherical surface.

3. A vehicle lamp as claimed in claim 2, wherein said plates comprise:
   a pair of upright walls respectively opposing said groove with a space greater than the diametric dimension of said spherical pivot held therebetween; and
   a pair of tilted walls tiltably projecting from said upright walls toward said groove, said tilted walls each having a leading end, wherein
   said leading end of each of said tilted walls opposingly contacts said spherical pivot, said leading end of one of said tilted walls facing said leading end of another of said tilted walls with a space smaller than the diametric dimension of said spherical pivot held therebetween;
   said leading end of each of said tilted walls extends from said inner surface of the lamp body, whereas an end portion thereof is opened thereon; and
   a stopper portion extended in a center direction of said spherical pivot is provided at said end portion thus left open.

4. A vehicle lamp as claimed in claim 1, wherein the spherical pivot is resin-molded integrally with said reflector and has a hollow directed to a center of said spherical pivot in an area along a parting line formed when said reflector is molded.

5. A vehicle lamp comprising:
   a lamp body;
   a reflector; and
   a fulcrum for tiltably supporting said reflector with respect to said lamp body;
   wherein said fulcrum includes a spherical pivot formed integrally with the reflector and a ball seat formed integrally with said lamp body; and wherein said spherical pivot is projected from said reflector in a direction substantially perpendicular to a mold-parting direction when said reflector is molded.

6. A vehicle lamp as claimed in claim 1, wherein said spherical pivot is projected from said reflector in a direction substantially parallel to a surface of a hollow separating molded halves of said spherical pivot.

7. A vehicle lamp as claimed in claim 5, wherein said spherical pivot is projected from said reflector in a direction substantially parallel to a surface of a hollow separating molded halves of said spherical pivot.

8. A method for molding a reflector of a vehicle lamp, the reflector having an integrally formed spherical pivot projecting from the reflector, said method comprising:

molding the reflector using at least two molds; and separating said molds in a direction substantially perpendicular to a direction in which the spherical pivot projects from the reflector.

9. A method for molding a vehicle lamp, the vehicle lamp having a lamp body, a reflector, and an aiming mechanism for tiltably supporting said reflector with respect to said lamp body, wherein the aiming mechanism includes a pivot structure serving as a fulcrum operating to tilt the reflector, the pivot structure including a spherical pivot formed integrally with the reflector and a ball seat formed integrally with the lamp body for receiving the spherical pivot, and the spherical pivot being projected from the reflector in a direction substantially perpendicular to a mold-parting direction when the reflector is molded, said method comprising:

molding the reflector using at least two molds; and separating said molds in a direction substantially perpendicular to a direction in which the spherical pivot projects from the reflector.

10. A method for molding a vehicle lamp as claimed in claim 9, said method further comprises forming a concave portion in a surface of said lamp body in said ball seat for receiving part of said spherical pivot.

* * * * *